(12) United States Patent
Barrett et al.

(10) Patent No.: US 7,765,388 B2
(45) Date of Patent: Jul. 27, 2010

(54) INTERRUPT VERIFICATION SUPPORT MECHANISM

(75) Inventors: Geoff Barrett, Bristol (GB); Richard Porter, Bristol (GB)

(73) Assignee: Broadcom Corporation, Irvine, CA (US)

(*) Notice: Subject to any disclaimer, the term of this patent is extended or adjusted under 35 U.S.C. 154(b) by 1011 days.

(21) Appl. No.: 10/664,055

(22) Filed: Sep. 17, 2003
(Under 37 CFR 1.47)

(65) Prior Publication Data
US 2005/0060577 A1    Mar. 17, 2005

(51) Int. Cl.
*G06F 9/00*    (2006.01)
*G06F 9/44*    (2006.01)
(52) U.S. Cl. .................. 712/244; 712/40; 712/233; 710/260; 710/266
(58) Field of Classification Search .................. 712/38, 712/233, 244, 40; 710/260, 266
See application file for complete search history.

(56) References Cited

U.S. PATENT DOCUMENTS

| | | | | |
|---|---|---|---|---|
| 4,498,136 A | * | 2/1985 | Sproul, III | 710/262 |
| 4,755,935 A | * | 7/1988 | Davis et al. | 712/233 |
| 4,777,587 A | * | 10/1988 | Case et al. | 712/235 |
| 5,557,759 A | * | 9/1996 | Crump et al. | 709/219 |
| 5,664,199 A | * | 9/1997 | Kuwahara | 710/261 |
| 6,704,863 B1 | * | 3/2004 | Paul et al. | 712/244 |
| 2003/0005212 A1 | * | 1/2003 | Cocca | 711/103 |

OTHER PUBLICATIONS

Bigelow, Ken. "The Two-Input Multiplexer", "The 2-to-4 Line Decoder/Demultiplexer", and "The 1-to-2 Line Decoder/Demultiplexer". © 1994, 2000-2006.*
Heuring, Vincent P. and Jordan, Harry F. "Computer Systems Design and Architecture". Reading, Mass.: Addison Wesley Longman, Inc., © 1997. pp. 497-499.*

* cited by examiner

*Primary Examiner*—Aimee J Li
(74) *Attorney, Agent, or Firm*—Sterne, Kessler, Goldstein & Fox, P.L.L.C.

(57) ABSTRACT

The present invention relates to a device for an interrupt verification support mechanism and the method for operating said device comprising a processor and an input for external interrupt requests or interrupt pseudo-instructions communicatively coupled to the processor. The method comprises the steps of processing at least one actual instruction in the processor in an instruction pipeline, and if an external interrupt request is received by the processor, the actual instruction is replaced with the pseudo-instruction. Pursuant to the method, instructions are concurrently processed in the processor in an instruction pipeline with several stages. In the instruction pipeline, instructions are processed by an instruction fetch stage, an instruction decode stage, an instruction issue stage, an execute stage and a result write-back stage. Thereby, interrupt requests are only processed at the fetch stage of the instruction pipeline. The device of an interrupt support mechanism and the method for operating said device provides the advantage a simplification of interrupt verification.

18 Claims, 4 Drawing Sheets

FIG. 4

INTERRUPT VERIFICATION SUPPORT MECHANISM

BACKGROUND OF THE INVENTION

The present invention relates to a design of a computer system that processes interrupt signals. Furthermore, the present invention relates to methods for operating a computer system controlled by a central processing unit in which the computer system processes interrupt signals. In particular, the present invention relates to an interrupt verification support mechanism to verify and to handle such interrupt signals and a method for operating the mechanism.

Methods of this type are used for example in real-time computer systems utilized in telecommunication modules of public and private networks and in general purpose computer systems utilized in personal computers. In a real-time computer system the processing of a program activated, for example as a reaction to an interrupt signal can be interrupted within a determined limited time interval, in order to continue the processing of this program only when higher-priority programs have been processed. During the processing of a program, e.g. in telecommunication modules, several thousand interrupt signals per second can occur, which respectively require an interruption of a program to be processed at that time and a reaction to the interrupt signal.

Known computer systems block the acceptance of further interrupt signals for a predetermined time interval, called the interrupt blocking time, so that interrupt signals coming in during this time interval are not taken into account is processed, and information or instructions can be lost. The interrupt blocking time is required so that the microprocessor can secure its registers, can react at least partly to the interrupt signal, and can again update its registers in order to be able to continue the interrupted program. The longer this interrupt blocking time is, all the more incoming interrupt signals go without being processed. It is therefore desirable to develop a computer operating system component that permits the acquisition of, and reaction to the highest possible number of occurring interrupt signals per time unit. In this context, In order to verify that an interrupt processing system operates correctly, it is necessary to ensure that interrupts have been correctly processed in a large number of circumstances. Some of these circumstances are very rare and require the timing of the interrupt to be timed precisely.

A common way to implement interrupts in a processor is to transform a respective instruction into a pseudo-interrupt instruction at a specific point in the process flow of the computer system. This means that, instead of behaving like, e.g., an arithmetic instruction, the instruction will perform the state changes associated with an interrupt, which is typically a branch with some associated changes to the processor state.

Interrupt verification usually relies on an external interrupt generator that is part of the test bench when a design is being verified. The timing of these interrupts can be performed either uncontrolled or controlled by fixed timings. A definition of the precise point at which an interrupt strikes in a stream of instructions that are run on a processor cannot be achieved by an uncontrolled timing of interrupts, since the timing is likely to vary and it does not allow the same test to be reproduced. A timing of interrupts controlled by fixed timings might obtain a determined point of interruption of the instruction flow, but is liable to change when the timing of internal signals changes, e.g. when a bug is fixed. Furthermore, a timing of interrupts controlled by fixed timings is hard to control because of the speed at which the external interrupt generator would have to run. A timing of interrupts controlled by probing signals inside the design cannot be run on silicon due to the impossibility of probing signals inside the respective silicon itself.

Therefore, in one variant of the invention a device and a corresponding method which is able to define the precise point at which an interrupt strikes in a stream of instructions that are run on a processor. In another variant of the invention, a device and a corresponding method which is able to reliably reproduce the same test running results on the silicon design as in a simulation. In yet another variant a computer, computer system comprising one or more computers, utilize the device and method described herein.

SUMMARY OF THE INVENTION

The present invention provides a method of processing an interrupt verification support mechanism in a computer system. The computer system comprises a processor and an input for external interrupts requests or interrupt pseudo-instructions communicatively coupled to the processor. The method comprises processing at least one actual instruction in the processor; and if an external interrupt request or an interrupt pseudo-instruction is received by the processor, the actual instruction is replaced with the pseudo-instruction.

In one variant, the method includes processing at least one actual instruction in the processor in an instruction pipeline wherein instructions are processed sequentially concurrently by an instruction fetch stage, an instruction decode stage, an instruction issue stage, an instruction execute stage and a result write-back stage.

In another variant, if an external interrupt request or an interrupt pseudo-instruction is received by the processor, replacing the actual instruction present in the instruction fetch stage is replaced with the pseudo-instruction. Optionally, the method includes one or more of the following creating the pseudo-instruction by a co-processor connected to the processor; simultaneously processing a number of instructions in the processor in an instruction pipeline with several instruction stages each instruction being in a different instruction stage at a time; storing at least the information of the program counter of the instruction which is to be interrupted and the sort of interrupt to use in a set of one or more interrupt registers of the processor; comparing the data content of a program counter with the data content of an interrupt register and replacing the actual instruction with a pseudo-instruction when the data content of the program counter matches the data content of the interrupt register, or when an external interrupt is present.

In yet a further aspect, the interrupt verification support mechanism device for a computer system is also provided. The device comprises a processor and an input for external interrupt requests or interrupt pseudo-instructions communicatively coupled to the processor, wherein the device includes a set of one or more interrupt registers each of which contains several information, at least the program counter of the instruction which is to be interrupted and the sort of interrupt to use, so as to enable the device to process at least one actual instruction, and if an external interrupt request or an interrupt pseudo-instruction is received by the processor, the actual instruction is replaced with the pseudo-instruction.

In one variant, the device further comprises one or more of the following: an instruction fetch with a program counter and an interrupt register, the instruction fetch being coupled to a first input of a de-multiplexer for transmitting instructions to said de-multiplexer, the second input of the de-multiplexer connected to an interrupt pseudo-instruction input and the program counter connected with the interrupt register by a comparator; the second input of the de-multiplexer which is capable of receiving interrupt pseudo-instruction signals or external interrupt requests; a comparator that creates a high level signal only if the data content of the program counter matches the data content of the interrupt register; an output of the comparator which is connected to the first input of an or-operator, and a second input of the or-operator which is connected to an interrupt controller so as to enable the or-operator to create a high level signal if the signal received from the interrupt controller differs from the signal received from the comparator.

In yet further variants, the data content of the program counter matches the data content of the interrupt register, and the actual instruction is replaced with a pseudo-instruction.

In yet a further aspect, one or more of the following operations or stages are present: when an external interrupt request is present at the de-multiplexer, the actual instruction is replaced with an interrupt pseudo-instruction; the instruction coming from the output of the de-multiplexer is sequentially processed in the instruction pipeline of the processor; the instruction pipeline of the processor includes an instruction fetch stage, an instruction decode stage, an instruction issue stage, an instruction execute stage and a result write-back stage; the interrupt pseudo-instruction effects the instruction state stages required by the interrupt; if an interrupt request or an interrupt pseudo-instruction is received by the processor, the processor is adapted to cancel an instruction that is in the instruction fetch stage when the interrupt request or the interrupt pseudo-instruction is received and to reissue the instruction starting at the instruction fetch stage; if an interrupt request or an interrupt pseudo-instruction is received by the processor, the processor is adapted to cancel an instruction that is in any instruction stage when the interrupt request or the interrupt pseudo-instruction is received and to reissue the instruction starting at the instruction fetch stage; a pseudo-instruction is created by a co-processor connected to the processor.

In yet a further aspect, the device is a media decoding system, the processor is a core decoder processor and the co-processor is a decoding accelerator adapted to assist the core processor with a decoding function. In one variant, the processor is a reduced instruction set computer (RISC) processor.

In yet further variants, a computer is provided that utilizes the device and method described herein.

These and other variants of the invention are apparent to those skilled in the art in the detailed description and drawings herein.

DETAILED DESCRIPTION OF THE PRESENTLY PREFERRED EMBODIMENTS

The above objectives and others are obtained by a processor architecture including an interrupt verification support mechanism and by a method for operating said interrupt verification support mechanism. The processor architecture includes a set of one or more interrupt registers each of which contains several pieces of information, i.e. the PC of the instruction which is to be interrupted and the sort of interrupt to use.

The solution according to the present invention benefically allows the same test performed in a simulation to be run on the silicon design because the interrupt generator has become part of the silicon design and is identical to the generator used in a simulation. When the PC of an instruction that is being executed in the stream of instructions matches the PC specified in one of the interrupt registers, then the matching instruction is interrupted at the appropriate stage in a processor pipeline.

The invention provides a method of processing an interrupt verification support mechanism in a computer system comprising a processor and an input for external interrupt requests or interrupt pseudo-instructions communicatively coupled to the processor. The includes processing at least one actual instruction in the processor; and if an external interrupt request is received by the processor, the actual instruction is replaced with the pseudo-instruction.

Pursuant to the method, instructions are processed in the processor in an instruction pipeline using several stages. In the instruction pipeline, instructions are processed sequentially by an instruction fetch stage, an instruction decode stage, an instruction issue stage, an execute stage and a result write-back stage. By providing an additional register holding the address of the program counter the problem of the asynchronous timing of interrupt instructions is overcome and an interrupt request can be processed at any stage of the instruction stream. The device of an interrupt support mechanism and the method for operating said device provides the advantage of a simplification of interrupt verification.

Another advantage of this implementation resides in the fact that the tests previously performed in a simulation can be identically reproduced on the silicon design. As another advantage tests performed on the silicon design are robust and unsusceptible to changes of the design. For instance, a design change can be necessary to change the timing of instructions in a pipeline of an instruction flow. Hence, design changes are a frequent consequence of fixing a bug during the development of the design. The implementation according to the present invention involves the advantageous effect that such changes of the design have no essential impact to the tests performed on the silicon design.

Most processor architectures contain registers for a so called "breakpoint" mechanism which allows debugger codes to be executed when a certain instruction is reached. In a preferred embodiment according to the present invention these registers are shared with the interrupt mechanism so that the state required to hold the program counter of the instruction to match is shared with state that is used to define a breakpoint. In particular, this is a 64-bit register where the bits 31:0 contain the PC to match, the bits 58:32 are unused and the bits 60:59 are used to signal what sort of interrupt is to be generated. To indicate that no interrupt has to be generated both bits are set to 0. Bit 61 is used to indicate whether the register is being used to indicate a breakpoint.

In one variant a method of processing instructions in a computer system is provided. The method. Pursuant to the method, instructions are processed in the processor in an instruction pipeline. In the instruction pipeline, instructions are processed sequentially by an instruction fetch stage, an instruction decode stage, an instruction issue stage, an instruction execute stage and a result write-back stage. If a co-processor instruction is received by the processor, the co-processor instruction is held in the core processor until the co-processor instruction reaches the exception raising stage, at which time the co-processor instruction is transmitted to the co-processor.

Another embodiment of the present invention is directed to a computer system having a processor and a co-processor. The processor processes instructions in an instruction pipeline. In the instruction pipeline, instructions are processed sequentially by an instruction fetch stage, an instruction decode stage, an instruction issue stage, an instruction execute stage and a result write-back stage. The co-processor is communicatively coupled to the processor and performs processing tasks in response to co-processor instructions provided by the processor. When the processor processes a co-processor instruction, the processor holds the co-processor instruction until the co-processor instruction reaches the exception raising stage, at which time the processor transmits the co-processor instruction to the co-processor.

Another embodiment of the present invention is directed to a computer system having a processor and a co-processor. The processor processes instructions in an instruction pipeline. In the instruction pipeline, instructions are processed sequentially by an instruction fetch stage, an instruction decode stage, an instruction issue stage, an instruction execute stage and a result write-back stage. The co-processor is communicatively coupled to the processor and performs processing tasks in response to co-processor instructions provided by the processor. When the processor processes a co-processor instruction, it dispatches the instruction to the co-processor at the decode stage or the execution stage, the co-processor can start executing the initial part of the co-processor instruction that does not change the state of the coprocessor, the rest of execution cannot be started until the coprocessor instruction reaches the exception raising stage.

The present invention is also used in a reduced instruction set computer (RISC) processor which typically processes instructions in an instruction pipeline. In a typical instruction processing pipeline, instructions are processed sequentially in stages, whereas said pipeline contains typically 3 to 9 stages. One existing pipeline architecture is a five-stage pipeline that includes an instruction fetch stage, during which the instruction is fetched from a bus or memory, an instruction decode stage, an instruction issue stage, an instruction execute stage, and a result write-back stage, during which the result is written to a register file in the processor. Some RISC processors include a co-processor interface through which the RISC processor can intimately issue instructions to another processing element. A processing element that is connected to the RISC processor via the co-processor interface is thus referred to as a co-processor. When an instruction that is being processed in a RISC processor is a co-processor instruction, the co-processor instruction is transmitted to the co-processor during the instruction execute stage.

In existing RISC processors, the instruction executed at each stage can raise exceptions or be interrupted. But in order to maintain a manageable order, the exception or interrupt is raised at a fixed stage, say at the instruction execute stage. This stage will be called the exception raising stage subsequently. When such an event occurs, all instructions before the write-back stage are cancelled, and the processor re-starts the execution of the instructions starting with the instruction that was in the instruction execute stage when the exception/interrupt occurred. In such a scheme, if a co-processor instruction is in the instruction execute stage when an interrupt is received, the co-processor instruction will have been already sent to the co-processor when the interrupt is received. As a result of the interrupt, the co-processor instruction will be cancelled and reissued beginning again at the instruction fetch stage. When the reissued co-processor instruction reaches the instruction execute stage, the co-processor will again be transmitted to the co-processor. One example of such a co-processor is one that has a consumable buffer storage. With such a co-processor, once a coprocessor instruction is executed, it consumes a certain number of entries of the buffer.

Figure 1:
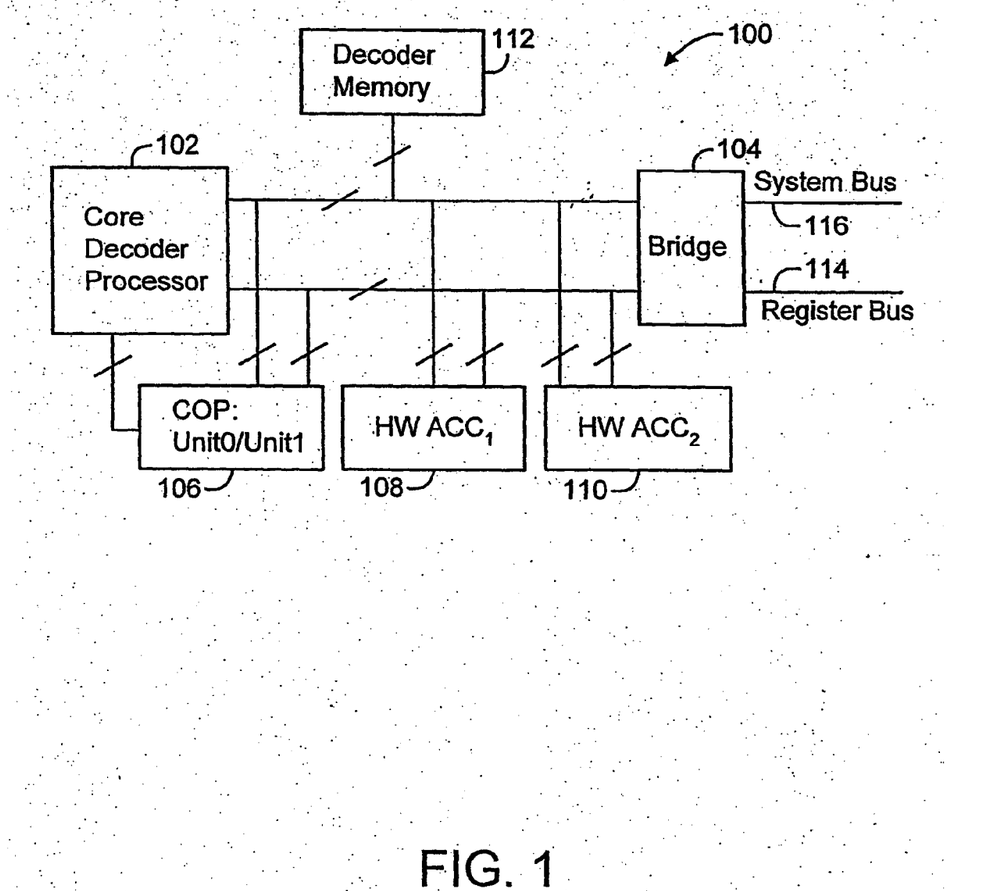
FIG. 1 is a functional block diagram of a computer system capable to implement an interrupt verification support mechanism and to perform the respective method according to the present invention.

A computer system comprising an interrupt verification support mechanism and capable to perform a method for operating the interrupt verification support mechanism according to an exemplary embodiment of the present invention is a media decoding system in one variant. FIG. 1 is a functional block diagram of an exemplary computer system 100 capable to perform a method for operating an interrupt verification support mechanism according to an exemplary embodiment of the present invention. In the exemplary computer system 100 shown in FIG. 1, the computer system is a media decoding system. For purposes of illustration, aspects of the present invention will be described relative to such a media decoding system, and in particular, to a video decoding system. However, it is to be understood that aspects of the present invention can be implemented in any of a multitude of computer systems.

The Decoding system 100 includes a core decoder microprocessor 102, bridge module 104, co-processor 106, two hardware accelerators 108 and 110, decoder memory module 112, register bus 114 and system bus 116. Register bus 114 and system bus 116 communicate with an external host and external memory (not shown). In an illustrative embodiment, the co-processor comprises two independent and identical units. In an exemplary embodiment, the bridge module 104 is a "switch center" that arbitrates between different modules. The bridge module illustratively may also include direct memory access (DMA) functionality.

The acceleration modules 108 and 110 are hardware accelerators that accelerate special decoding tasks that would otherwise be bottlenecks for real-time media decoding if these tasks were handled by the core processor 102 alone. This helps the core processor 102 to achieve the required performance. Alternatively, the co-processor 106 is also a hardware accelerator that communicates with the core processor 102 via a co-processor interface of the core processor 102. The decoding system 100 is a video decoding system, the co-processor 106 is a variable-length decoder and the acceleration modules perform one or more video decoding tasks such as inverse quantization, inverse discrete cosine transformation, pixel filtering, motion compensation and deblocking. The system of FIG. 1 is exemplary and the decoding system 100 may have any number of hardware accelerators.

The core processor 102 is the central control unit of the decoding system 100. In the exemplary computer system, the core processor 102 receives the data units from the bitstream to be decoded. The core processor 102 prepares the data for decoding. In a computer system wherein the data being decoded are video data, the data unit comprises macroblock coefficient data. The core processor 102 extracts the control information and data for each data unit. The co-processor unit 106 assists the core processor 102 in decoding the header information. After extracting the control information and data for each data unit, the core processor 102 illustratively deposits the appropriate control information and data in decoder memory 112. In an alternative embodiment, the core processor 102 provides the processed control information and data directly to the co-processor 106 for processing by the co-processor 106. The core processor 102 also orchestrates a data unit processing pipeline (such as a macroblock processing pipeline) for the acceleration modules 106, 108 and 110 and fetches the required data from an external memory via the bridge module 104.

The core processor 102 may also handle some data processing tasks. As the decoding system 100 is a video decoding system, picture level processing, including sequence headers, GOP headers, picture headers, time stamps, macroblock-level information except the block coefficients, and buffer management, are performed directly and sequentially by the core processor 102, without using the accelerators 106, 108, 110, except for using a variable-length decoder 106 to accelerate general bitstream parsing. The bridge module 104 arbitrates and moves data between decoder memory 112 and the external memory.

The bridge interface 104 illustratively includes an internal bus network that includes arbiters and a direct memory access (DMA) engine, and the bridge module 104 serves as an asynchronous interface to the system buses. Decoder memory 112 is used to store data unit data and other time-critical data used during the decoding process. The co-processor 106 and hardware accelerators 108 and 110 use the decoder memory 112 as the source and destination memory for their normal operation. In an illustrative embodiment of the present invention, decoder memory 112 is a static random access memory (SRAM) unit. The external host has access to decoder memory 112, and the bridge module 104 can transfer data between decoder memory 112 and an external memory. The arbiter for decoder memory 112 is in the bridge module 104.

Figure 2:
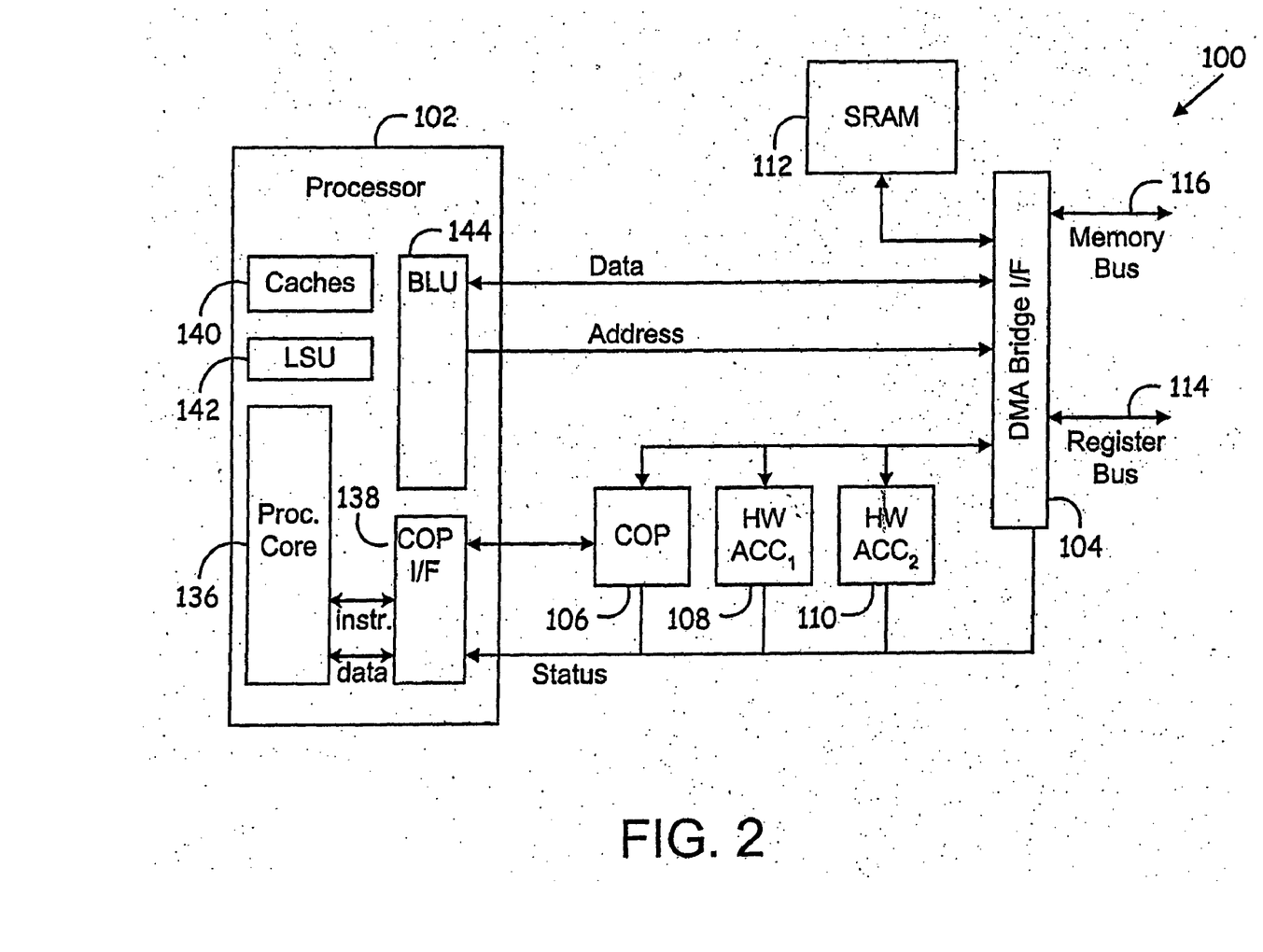
FIG. 2 is a functional block diagram of a computer system capable to implement an interrupt verification support mechanism and to perform the respective method according to the present invention.

In another embodiment of the computer system comprising an interrupt verification support mechanism and capable to perform a method for operating said interrupt verification support mechanism according to an exemplary embodiment of the present invention, the core processor is a reduced instruction set computer (RISC) processor, such as a MIPS processor, for example. FIG. 2 is a functional block diagram of an exemplary decoding system 100 wherein the core processor 102 is a RISC processor and shows the interfaces of the core decoder processor 102 to other blocks in the exemplary decoding system 100. In FIG. 2, elements that are equivalent to elements in FIG. 1 are given the same reference numbers as their corresponding elements in FIG. 1. To achieve a higher performance level, module 106 is directly connected to the core processor 102 through a fast co-processor interface 138. Co-processor commands are sent to the co-processor 106 from the processor core 136 via co-processor commands. Results and status are passed between the core processor 102 and the co-processor 106 through move instructions and copy instructions.

The DMA block 104 routes requests between blocks in the decoding system 100. The core processor memory accesses are performed through the bus interface unit (BLU) 144 of the decoder processor 102 and DMA block 104. The core processor 102 is in charge of issuing memory requests to move data between the decoder memory 112 and the external memory. Hardware accelerators 108 and 110 receive commands via memory-mapped writes from the core processor 302.

The core 136 may employ a MIPS32 instruction set architecture (ISA) and have a multiply-divide unit (MDU) that performs fast integer multiply, multiply-accumulate, multiply-subtract, and divide operations. The core 136 also includes a memory management unit (MMU) that uses fixed mapping. In an illustrative embodiment, the MMU does not implement a translation look-aside buffer (TLB) for page-based memory management, as is available in typical MIPS32 ISA processors. The core processor also includes a debugging support unit (DSU). In an illustrative embodiment, the DSU interfaces with an external EJTAG block, which in turn interfaces with a host CPU performing the debugging.

The core processor 102 includes a load store unit (LSU) 142 that processes all types of load (read) and store (write) requests. The bus interface unit 144 processes all memory accesses. One or two data buffers are installed in BLU 144 for buffering incoming and outgoing data between the core processor 102 and decoder memory 112 and system memory. As an example, a write buffer stages any memory-bound data so that the core processor 102 need not wait until the store data are actually placed in the memory. Without such a buffer, in the case of cache misses and non-cacheable reads, the core processor 102 would be stalled until the data is returned. The core processor 102 may also include instruction and data caches 140.

Figure 3:
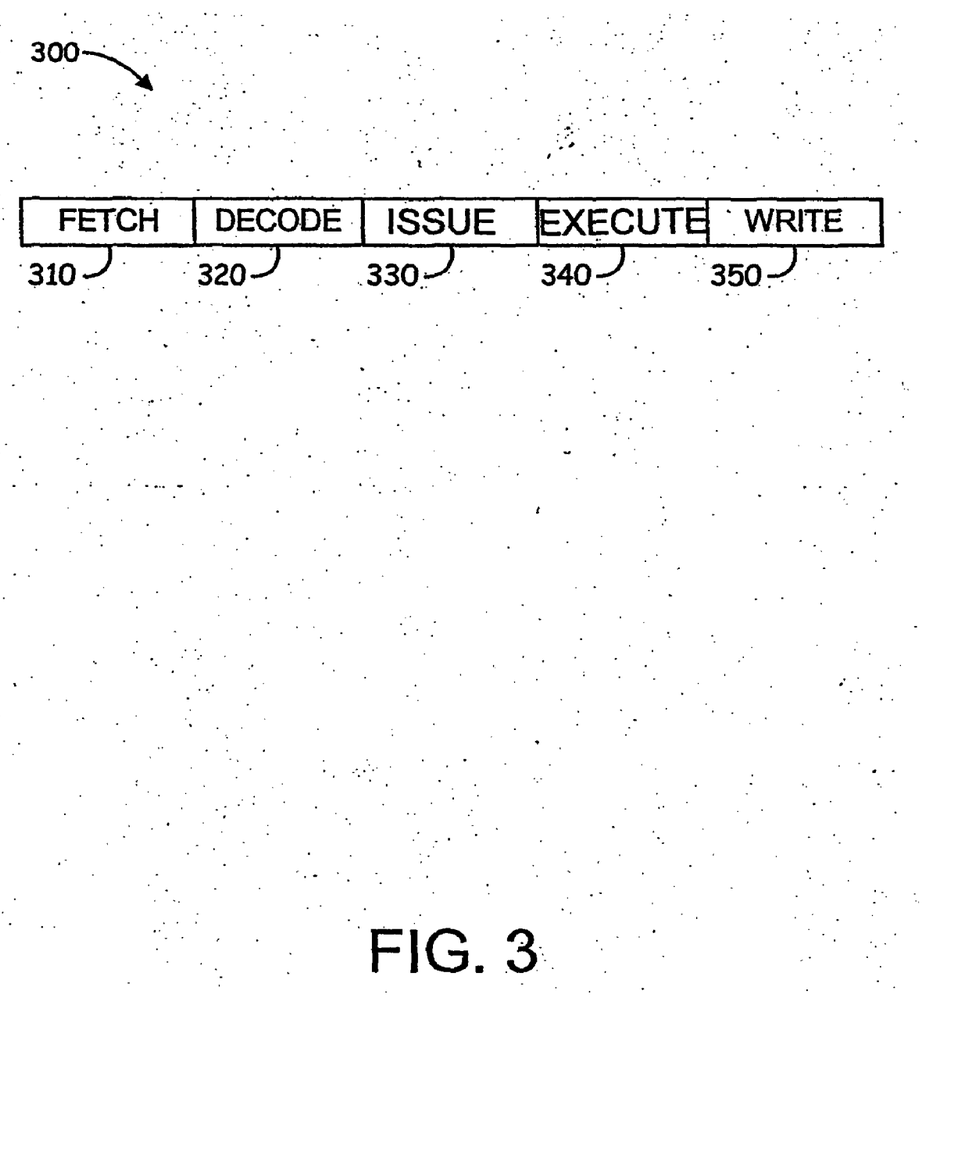
FIG. 3 is a chart showing a core processor instruction pipeline of a computer system capable to implement an interrupt verification support mechanism and to perform the respective method according to the present invention.

In an exemplary embodiment of the computer system capable to perform a method for operating the interrupt verification support mechanism according to an embodiment of the present invention, the core processor 102 is based on an instruction pipeline 300, as shown in FIG. 3. The illustrative instruction pipeline shown in FIG. 3 includes five stages. The five stages of the core processor pipeline are instruction fetch stage 310, instruction decode stage 320, instruction issue stage 330, instruction execute stage 340 and write-back stage 350. There can be up to five instructions simultaneously being executed in the five-stage pipeline. In an alternative embodiment of the present invention, the core processor 102 is based on a six-stage pipeline that includes two instruction fetch stages. In the first instruction fetch stage, the instruction is retrieved from the instruction cache. In the second instruction fetch stage, branch handling and hit/miss resolution are performed with respect to the instruction. There can be up to six instructions simultaneously being executed in the 6-stage pipeline.

In FIG. 2, the co-processor 106 is directly connected to the core processor 102 through a co-processor interface 138 and the co-processor 106 is architected as a co-processor to the decoder processor 102. That is, the co-processor 106 can operate on a single-command basis where the decoder processor 102 issues a command (via a co-processor instruction) and waits (via a move-from-coprocessor instruction) until it is executed by the co-processor 106, without polling a status register in the co-processor 106 to determine completion of the command. In an illustrative computer system, the core processor 102 makes available a co-processor usability bit in a system control status register to activate the co-processor 106. The core processor 102 detects co-processor instructions and passes them to the co-processor 106 to execute. The core processor 102 decodes and executes co-processor move instructions to transfer data between the registers in the co-processor interface 138 and the general registers in the processor core 136. The core processor 102 executes co-processor copy instructions to access the status of each block 106, 108, 110 with a general register in the core processor 102. In an illustrative embodiment, for co-processor instructions that move data between the registers in the co-processor 106 and the general registers in the core processor 102, the pipeline control in the core processor 102 will stall the instruction pipeline 300 when the data are not ready in the co-processor 106.

The pipeline control in the core processor 102 may need to be synchronous with the co-processor 106 when issuing co-processor instructions. The co-processor interface 138 acts as the front end of the modules 106, 108, 110 to perform this type of synchronization with the core processor 102. In an illustrative embodiment of the present invention, the core processor 102 runs at twice the frequency of the other processing modules 106, 108, 110.

In general, there are two types of co-processor instructions: i) instructions issued at the core processor 102 but executed completely at the co-processor 106, and ii) instructions that move data between the core processor 102 and the co-processor 106. Instructions of type i) will be called co-processor commands in this document. The core processor 102 sends co-processor commands to the co-processor 106 directly so that a certain task can be performed. The co-processor 106 decodes individual co-processor commands before execution. Instructions of type ii) include move-to-coprocessor (MTC) instructions, which cause data to be written from the core processor 102 to the co-processor 106, and move-from-coprocessor (MFC) instructions which causes the core processor 102 to read data from the co-processor 106.

In an exemplary embodiment of the computer system, the co-processor 106 includes two co-processor units, $Unit_0$ and $Unit_1$. In this embodiment, the core processor 102 can only issue commands to one of the co-processor units at a time. The active co-processor unit is determined by the value of a co-processor unit-select register. In an exemplary embodiment, when the control register has a value 0, all co-processor instructions are sent to $Unit_0$, and when the control register has a value 1, all co-processor instructions are sent to $Unit_1$. The value in the control register is changed by a copy-control-to instruction and can be read by a copy-control-from instruction. For the rest of this discussion, the co-processor 106 referred to is the active co-processor unit under the current unit-select register value. In an illustrative embodiment wherein system 100 is a video decoding system, the co-processor 106 is a variable length decoder (VLD) that includes two VLD units, one of which is a programmable unit having a code RAM and the other of which is hard-coded to decode bitstreams according to a particular decoding standard.

Referring to the pipeline diagram in FIG. 3, at instruction decode stage 320, the instruction decoder in the core processor 102 decodes the instruction. The instruction decoder recognizes the instruction as a co-processor instruction by examining bits 26-31 (400), and recognizes that the instruction is a co-processor command because bit 25 is set. The core thus passes the co-processor function (bits 0-24 (404)) to the co-processor. To execute a co-processor command, the co-processor decodes the field.

In the illustrative embodiment wherein the instruction pipeline of the core processor 102 is a five-stage pipeline, like the one shown in FIG. 3, there can be up to five or more instructions simultaneously being executed in the instruction pipeline (and up to six or more instructions in a six-stage pipeline). Like in most pipelined processors, an instruction can be cancelled due to interrupts or exceptions in any pipeline stage before the results of the instruction are committed in the write-back stage 350. When an instruction is cancelled, it is restarted from its instruction fetch stage 310. If an interrupt is detected in the issue stage 330, the interrupt is raised in the instruction execute stage 340, and the instructions from the fetch stage 310 to the issue stage 330 when the interrupt is detected will be cancelled and re-issued. Because a co-processor command can change the co-processor state, reissuing a cancelled co-processor command is complicated to support in the co-processor 106.

Alternatively, the co-processor interface 138 of processor 102 holds on to a co-processor instruction until the instruction reaches the instruction execute stage 340, and only then dispatches the co-processor instruction to the co-processor 106. All co-processor instructions, including co-processor commands, MFC instructions and MTC instructions, are dispatched by the core processor 102 to the co-processor 106 at the instruction execute stage 340 of the core processor pipeline 300. If there is an interrupt or exception raised before the co-processor command reaches the instruction execute stage 340, the command is cancelled before it is sent to the co-processor 106. It will be re-issued just like all other regular core processor instructions. If no interrupt or exception is raised before the co-processor instruction reaches the instruction execute stage 340, the co-processor command is sent to the co-processor 106 in the instruction execute stage 340.

This ensures that the co-processor instruction is not cancelled after it is dispatched to the co-processor. As such, a co-processor instruction appears to the core processor 102 like a load or store instruction, in that it is executed in the instruction execute stage 340 and completed in the write back stage 350. Holding the co-processor instruction until the instruction execute stage 340 also avoids the ambiguity that would occur if a later-issued instruction arrived at the co-processor 106 before an earlier one. The data-moving co-processor instructions, such as MFC and MTC, are also dispatched to the co-processor 106 in the execute stage and they are interruptible even if they are waiting for the data to be ready. These co-processor instructions should have no side effect even when they are reissued in the core processor 102 and re-executed in the co-processor 106.

In FIG. 1, by way of example, on receiving a co-processor command, the co-processor 106 performs the task the command dictates and sets a command-done signal to indicate the completion of the command by the co-processor 106. The command-done signal can only be cleared by a subsequent co-processor command issued by the core processor 102. In the case where the co-processor 106 is a variable-length decoder, the co-processor 106 is capable of executing a variety of commands issued by the core processor, including, but not limited to, variable-length decode (VLD), get bits, grab bits, start code search, download code table (from main memory 110), transfer data to main memory 110, and VLD block decode. During the execution of a co-processor command, no new commands will be accepted by the co-processor 106. Therefore, before issuing new commands, the decoder processor 102 checks to see if an earlier issued command is finished by polling (MFC read instruction) a command status register in the co-processor 106 that generates the command-done signal.

In another variant, the co-processor 106 includes general co-processor registers and co-processor control registers. The general registers are used to hold the data and results of the co-processor commands. The control registers (such as the command status register mentioned above) are used to hold the status and error conditions of the co-processor. In an illustrative embodiment of the present invention, the control registers are also used to hold the status and error conditions of the other functional blocks of the system 100, such as hardware accelerators 108 and 110. The following discussion describes co-processor instructions used to transfer the contents of the co-processor registers to and from the general registers of the core processor 102.

The move-to-coprocessor (MTC) instruction is a register write instruction that is used by the core processor 102 to load the contents of a general register residing in the core processor 102 to a general register in the co-processor 106. The MTC instruction includes one or more "set" bits that indicate the set of co-processor registers to copy the data to.

The move-from-coprocessor (MFC) instruction is a register read instruction used by the core processor 102 to load the contents of a general register in the co-processor 106 to a general register in the core processor 102. One such co-processor register that the core processor 102 may need to read is the command status register. The MFC instruction includes one or more "set" bits that indicate the set of co-processor registers to copy the data to. The move-from-coprocessor instruction also includes a "wait" bit. The move-from-coprocessor instruction behaves differently with respect to reading a co-processor register depending on the value of the wait bit.

In another exemplary embodiment of the computer capable to perform a method for operating the interrupt verification support mechanism according to an exemplary embodiment of the present invention system wherein the co-processor 106 runs at half the speed of the core processor 102, a move-from-coprocessor command uses at least two core processor clock cycles for the co-processor to return the read result. Therefore, in an illustrative embodiment, a move-from-coprocessor instruction stalls the core processor pipeline 300 by two core processor clock cycles.

One use of the move-from-coprocessor instruction is the reading of a snapshot value of a register or simply reading back a previously programmed register for verification. In this case, the core processor 102 needn't wait for the command to be completed before reading the source register. In such a case, the wait bit will be low, for example. When the wait bit is low, read results are instantly returned to the core processor 102 without considering whether the data that is being read is updated, or whether the data is valid. The core processor will get the read data instantly (of course there is optionally a fixed one or two clock cycle delay).

Another use of the move-from-coprocessor instruction is the reading of results of a previously issued co-processor command or the status of the co-processor 106. In this case, a previously issued command may not have finished, in which case its results would not be valid and the core processor 102 waits for the command to be completed before reading the source register. Therefore, in an illustrative embodiment, when the wait bit is set, the move-from-coprocessor instruction will not finish its operation, or will wait, until the data to be read is updated and becomes valid. This is done by checking the command-done flag in the co-processor 106 and finishing the read when the co-processor 106 is done with its current task.

The co-processor interface 138 of the core processor 102 is responsible for MFC register decoding. Therefore, the co-processor interface 138 provides the appropriate stall control for the core processor pipeline. MFC instructions can be consecutive with pipeline stalls between them.

At times when the co-processor 106 cannot complete certain tasks or encounters error conditions, it can raise an external interrupt to the core processor 102. This external interrupt can interrupt the core even if the core is stalled due to an outstanding MFC instruction. In an illustrative embodiment, the interrupt will be delayed for all other stall situations, such as a cache miss.

The control registers in the co-processor 106 are used to keep the status and configuration settings of the co-processor 106. In an embodiment wherein the co-processor comprises two co-processor units, the co-processor includes a unit-select register to indicate which unit is active. A status register comprising one or more bits indicates the status of the active unit of the co-processor 106. In an illustrative embodiment, global status registers in the co-processor 106 are used to hold the status and error conditions, i.e., the condition code, of other functional blocks in the system 100, such as hardware accelerators 108 and 110. In an illustrative embodiment, a few bits per module are allocated to each hardware accelerator module 108 and 110 to indicate the condition code of the module. In an illustrative embodiment, except the unit-select register, all of the co-processor control registers are read-only by the core processor 102. Each hardware accelerator resets its condition code bits in its global status registers when it receives commands from the core processor 102, and it sets the condition code bits i) when it completes the commands and is ready to receive another command or ii) when it encounters an error condition. The type of error can be retrieved from a register of the hardware accelerator block by issuing a read of the corresponding memory location.

Copy instructions are used to access the control registers of the co-processor 106. A copy-control-from-coprocessor (CFC) instruction copies the contents of a specified control register to a specified general register in the core processor 102. A copy-control-to-coprocessor (CTC) instruction loads the contents of a specified general register in the core processor 102 into a specified control register in the co-processor 106. In addition to passing requests and data between the co-processor 106 and the core 136 of the processor 102, the co-processor interface 138 has buffers for holding the data and status in order to reduce access latency.

The core processor 102 accesses the registers in the functional blocks such as hardware accelerators 108 and 110 through memory reads and writes. This is achieved by allocating a small sub-segment of memory in a noncacheable memory segment in the core processor's 102 address space. The mapping can be stored in the BLU 144 or the DMA bridge 104. In an illustrative embodiment of the present invention, when the core processor 102 wants to make sure all reads and writes are completed in the system 100, it issues a (noncacheable) read from a special location to a dummy register. The read is sent out to the DMA bridge 104 when the core processor's write buffer is empty. When the DMA bridge 104 receives the read, it will make sure all of the core processor's requests are completed, and then it will return a piece of dummy data to the core processor 102.

The bus interface unit (BLU) 144 is in charge of all memory requests for the core processor 102. The BLU 144 includes a FIFO write buffer to stage outgoing data. The following byte-gathering scheme is implemented on the write buffer to minimize the number of memory store requests. If the core processor 102 performs a copy-back of a data cache line, the dirty line is placed in an entire new entry of the write buffer. If the core processor 102 performs a noncacheable write, the data is placed into the write buffer in one of the following ways. If it's at the beginning of a data entry of predetermined size, the data is placed in the next new entry which will be referred to as the active entry. If the data are next to the previous written data in a data entry boundary, the two requests are combined into one. Data in an entry are ready to be sent to the data bus if i) the data are the size of one full data entry, ii) the entry is not the active one, iii) an exception has occurred, or iv) the core processor 102 is about to send out a read request to the data bus.

The instruction pipeline 300 of the core processor is stalled if a core processor memory store finds the write buffer is full. The write buffer is flushed, i.e., all valid entries are written to the memory, before i) a core processor memory read request can be sent to the memory or ii) the core processor can complete a synchronize instruction. When the data of an entry are written to the data bus, all following valid entries are shifted down.

Figure 4:
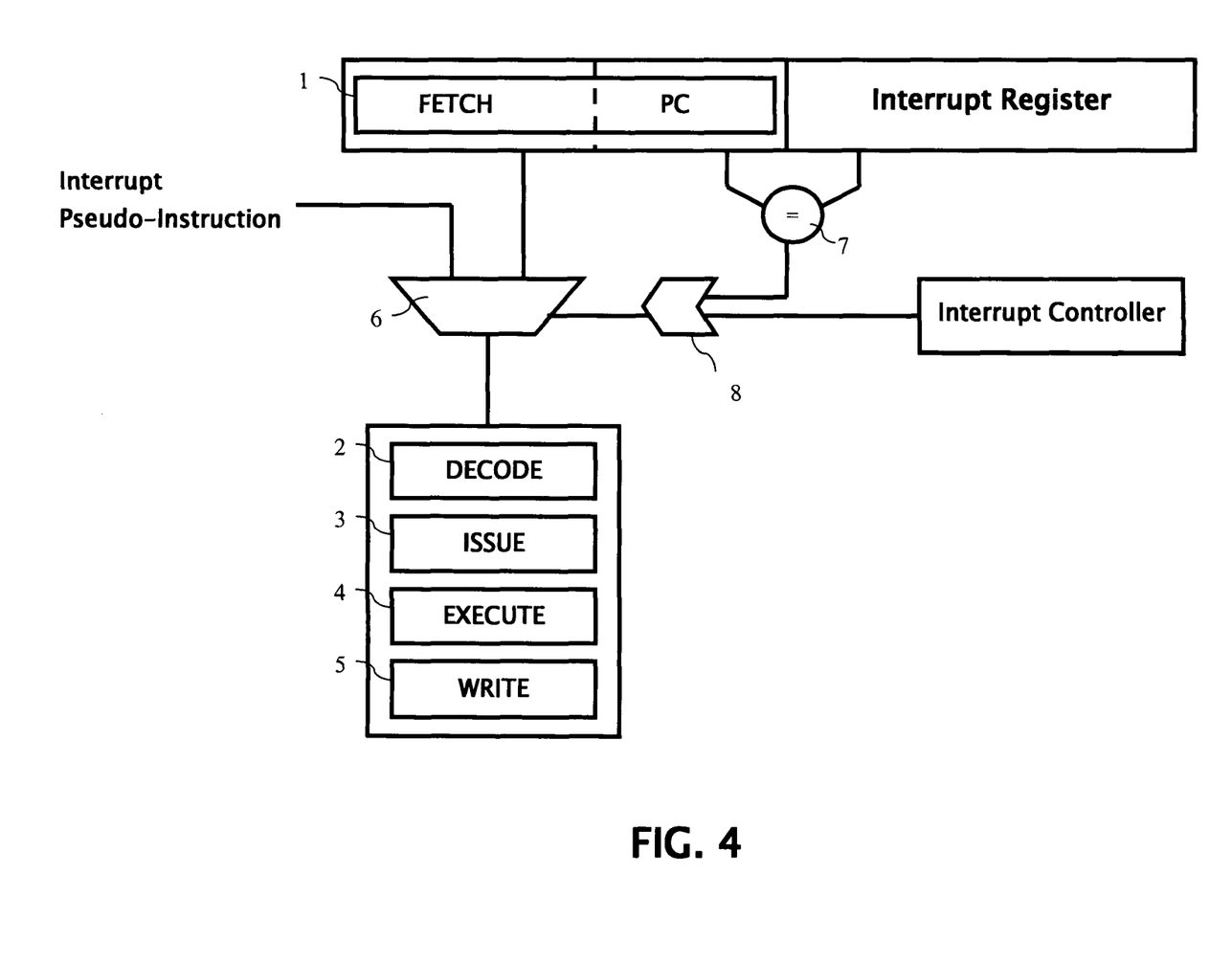
FIG. 4 shows an apparatus that processes an instruction in an instruction pipeline according to an illustrative embodiment of the present invention.

FIG. 4 shows an apparatus that processes an instruction in an instruction pipeline with an interrupt verification support mechanism according to an illustrative embodiment of the present invention. As already described in detail the instructions to be performed by the computer system are processed in the processor by flowing through an instruction pipeline. In the instruction pipeline, the instructions are processed sequentially in several stages, i.e. an instruction fetch stage 1, an instruction decode stage 2, an instruction issue stage 3, an instruction execute stage 4 and a result write-back stage 5. Each stage 1 to 5 may have a different instruction in it. The instruction fetch comprises a program counter PC and is coupled to the first input of a multiplexer 6 for transmitting actual instructions to the multiplexer 6. The second input of the multiplexer 6 is connected to an interrupt pseudo-instruction input. Via said second input of the multiplexer 6 interrupt pseudo-instruction signals or external interrupt requests can be received.

The program counter PC is coupled with the interrupt register by a comparator 7. The comparator 7 creates a high level signal only if the data content of the program counter PC matches the data content of the interrupt register. The output of the comparator 7 is coupled to the first input of an or-operator 8, and the second input of the or-operator is connected to an interrupt controller. The or-operator 8 creates a high level signal only if the signal received from the interrupt controller deviates from the signal received from the comparator 7. This design results in the following function: When the program counter PC matches the interrupt register, or an external interrupt is present, the actual instruction is replaced with a pseudo-instruction. Subsequently, the instruction coming from the output of the de-multiplexer 6 is sequentially processed in the instruction pipeline in the instruction fetch stage 1, the instruction decode stage 2, the instruction issue stage 3, the instruction execute stage 4 and the result write-back stage 5. Thus, the interrupt pseudo-instruction effects the instruction state stages required by the interrupt. In a preferred embodiment of the present invention the interrupt pseudo-instruction is created by a co-processor coupled to the de-multiplexer 6.

Although several variants of the invention have been described, they should not be construed to limit the scope of the appended claims. For example, the present invention is applicable to any type computer system employing a co-processor coupled to a main processor through a co-processor interface, including any media decoding systems, such as audio and graphics decoding systems, in addition to the video decoding system illustratively described herein. Those skilled in the art will understand that various modifications may be made to the described embodiment. Moreover, to those skilled in the various art, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention. Although such modifications and changes may be suggested by those skilled in the art, it is the intention of the inventors to embody within the patent warranted hereon all changes and modifications as reasonably and properly come within the scope of their contribution to the art.

We claim:

1. A method of processing an interrupt verification support mechanism in a computer system comprising a processor and an input for external interrupts communicatively coupled to the processor, the method comprising:
   processing at least one actual instruction in the processor;
   comparing data content of a program counter with data content of an interrupt register to determine if the data content of the program counter matches the data content of the interrupt register; and
   if an external interrupt request is received by the processor or if the data content of the program counter matches the data content of the interrupt register, replacing the actual instruction in an instruction fetch stage of the processor with an interrupt pseudo-instruction.

2. The method of claim 1, further comprising:
   processing at least one actual instruction in the processor in an instruction pipeline, wherein instructions are processed concurrently by an instruction fetch stage, an instruction decode stage, an instruction issue stage, an instruction execute stage and a result write-back stage.

3. The method of claim 1, wherein the interrupt pseudo-instruction is created by a co-processor connected to the processor.

4. The method of claim 1, further comprising:
   simultaneously processing a plurality of instructions in an instruction pipeline of the processor, wherein the instruction pipeline including several instruction stages.

5. The method of claim 1, further comprising:
   storing information of a sort of interrupt to use in a register of the processor.

6. A processor configured to support interrupt verification, the processor comprising:
   a program counter;
   a fetch register configured to store at least one actual instruction;
   an interrupt register configured to store data content associated with an instruction that is to be interrupted;
   a comparator configured to compare the data content of the interrupt register with data content of the program counter to determine if the data content of the interrupt register matches the data content of the program counter; and
   a multiplexer configured to replace the at least one actual instruction with an interrupt pseudo-instruction if an external interrupt request is received by the processor or if the data content of the program counter matches the data content of the interrupt register.

7. The processor of claim 6 further comprising:
   an instruction fetch that includes the fetch register, the program counter, and the interrupt register, wherein the fetch register is coupled to a first input of the multiplexer.

8. The processor of claim 7, wherein a second input of the multiplexer is coupled to the interrupt pseudo-instruction.

9. The processor of claim 7, wherein the comparator creates a high level signal if the data content of the program counter matches the data content of the interrupt register.

10. The processor of claim 7, wherein an output of the comparator is connected to a first input of an or-operator, and a second input of the or-operator is connected to an interrupt controller to enable the or-operator to create a high level signal if a signal received from the interrupt controller differs from a signal received from the comparator.

11. The processor of claim 7, wherein an instruction coming from an output of the multiplexer is sequentially processed in an instruction pipeline of the processor.

12. The processor of claim 7, wherein an instruction pipeline of the processor includes an instruction fetch stage, an instruction decode stage, an instruction issue stage, an instruction execute stage and a result write-back stage.

13. The processor of claim 12, wherein if an interrupt request or an interrupt pseudo-instruction is received by the processor, the processor is configured to cancel an instruction that is in the instruction fetch stage and to reissue the cancelled instruction starting at the instruction fetch stage.

14. The processor of claim 12, wherein if an interrupt request or an interrupt pseudo-instruction is received by the processor, the processor is configured to cancel an instruction that is in any instruction stage and to reissue the cancelled instruction starting at the instruction fetch stage.

15. The processor of claim 7, wherein the interrupt pseudo-instruction effects instruction state stages required by the interrupt pseudo-instruction.

16. The processor of claim 6, wherein the interrupt pseudo-instruction is created by a co-processor connected to the processor.

17. The processor of claim 16, wherein the processor is a core decoder processor and the co-processor is a decoding accelerator configured to assist the core processor with a decoding function.

18. The processor of claim 16, wherein the processor is a reduced instruction set computer (RISC) processor.

* * * * *